Figure 1:
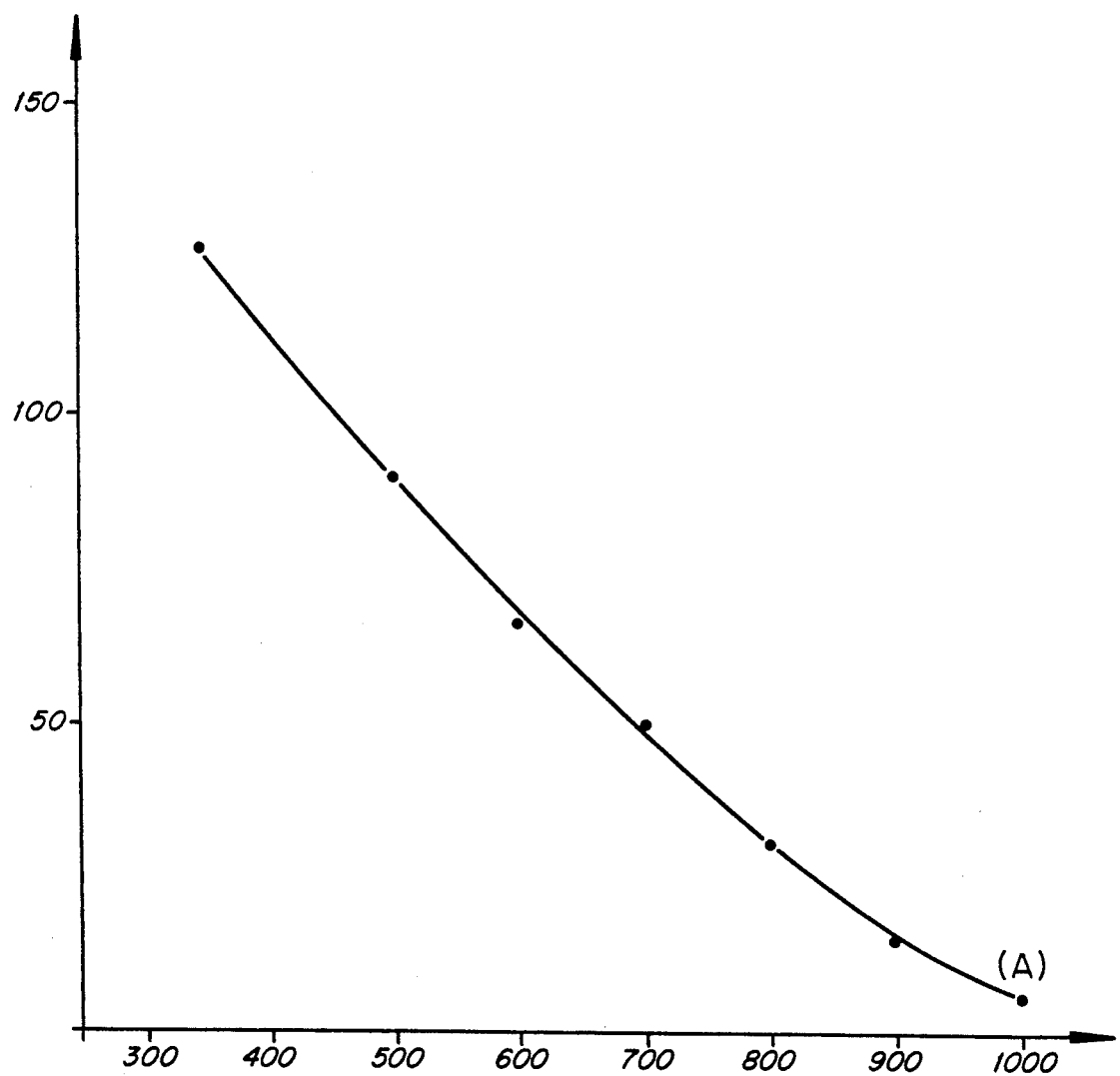

United States Patent [19]

Le Loarer

[11] Patent Number: 5,011,671
[45] Date of Patent: Apr. 30, 1991

[54] CERIC OXIDE WITH NEW MORPHOLOGICAL CHARACTERISTICS AND METHOD FOR OBTAINING SAME

[75] Inventor: Jean-Luc Le Loarer, La Rochelle, France

[73] Assignee: Rhone-Poulenc Chimie, Courbevoie, France

[21] Appl. No.: 213,189

[22] Filed: Jun. 29, 1988

[30] Foreign Application Priority Data

Jun. 29, 1987 [FR] France .................. 87 09122

[51] Int. Cl.$^5$ .............................. C01F 17/00
[52] U.S. Cl. ....................................... 423/592
[58] Field of Search ............ 423/263, 592, 21.7, 423/21.5

[56] References Cited

U.S. PATENT DOCUMENTS

| | | | |
|---|---|---|---|
| 4,231,997 | 11/1980 | Pitts | 423/395 |
| 4,545,923 | 10/1985 | Graaeff et al. | 252/309 |
| 4,601,755 | 7/1986 | Melard et al. | 106/3 |
| 4,647,401 | 3/1987 | Graaeff et al. | 423/21.1 |
| 4,661,330 | 4/1987 | Chane-Ching et al. | 423/263 |
| 4,663,137 | 5/1987 | Chane-Ching et al. | 423/263 |
| 4,786,325 | 11/1988 | Melard et al. | 106/3 |
| 4,859,432 | 8/1989 | David | 423/21.1 |

FOREIGN PATENT DOCUMENTS

| | | | |
|---|---|---|---|
| 0208580 | 1/1987 | European Pat. Off. | |
| 0216687 | 4/1987 | European Pat. Off. | 423/21.1 |
| 2593195 | 7/1987 | France . | |
| 60-96527 | 5/1987 | Japan | 423/21.1 |
| 1159886 | 6/1985 | U.S.S.R. | 423/21.1 |

*Primary Examiner*—Peter D. Rosenberg
*Attorney, Agent, or Firm*—Burns, Doane, Swecker & Mathis

[57] ABSTRACT

The object of the present invention is a ceric oxide with new morphological characteristics. The invention also relates to one of the methods for obtaining said oxide.

The method of the invention is characterized by the fact that a ceric hydroxide, prepared by base precipitation using a solution of a cerium salt, undergoes a solvo-thermal treatment before the calcination operation.

The ceric oxide obtained has a large specific surface at high temperatures.

27 Claims, 1 Drawing Sheet

CERIC OXIDE WITH NEW MORPHOLOGICAL CHARACTERISTICS AND METHOD FOR OBTAINING SAME

The object of the present invention is a ceric oxide with new morphological characteristics. The invention also relates to one of the methods for obtaining said oxide.

In the following description of the invention, "specific surface" means the specific B. E. T. surface determined by nitrogen adsorption in accordance with the ASTM D 3663-78 standard established by the BRUNAUER-EMMETT-TELLER method described in "The Journal of American Society, 60, 309 (1938)".

It is known that ceric oxide can be used as a catalyst or as a catalyst support. For example, the works of Paul MERIDEAU et al can be cited relative to the synthesis of methanol from $CO+H_2$ on platinum catalysts deposited on the ceric oxide. (C. R. Acad. Sc. Paris Vol. 297 -Series II-471-1983).

It is also well known that a catalyst is generally more effective when the contact surface between the catalyst and the reagents is larger. For this purpose, it is necessary for the catalyst to be maintained in the most divided state possible, that is, that the solid particles which compose it be as small and individualized as possible. The fundamental role of the support, therefore, is to maintain the catalyst particles or crystallites in contact with the reagents, in the most divided state possible.

During the extended use of a catalyst support, a decrease in the specific surface occurs due to the coalescence of the very fine micropores. During this coalescence, part of the catalyst is surrounded by the body of the support and can no longer be in contact with the reagents.

Until now, the majority of ceric oxides prepared had a specific surface which decreased rapidly for working temperatures greater than 500° C. Thus, from an ammonium cerinitrate, R. ALVERO et al (J. Chem. Soc. Dalton Trans 1984, 87) obtained a ceric oxide having a specific surface of 29 $m^2/g$ after calcination at a temperature of 600° C.

In addition, FR-A 2,559,754 describes a ceric oxide with a specific surface of at least $85\pm5$ $m^2/g$ obtained after calcination between 350° and 450° C. and, preferably, between 100 and 130 $m^2/g$ after calcination between 400° and 450° C. Said oxide is prepared by hydrolysis of an aqueous solution of ceric nitrate in a nitric acid medium, then separation of the precipitate obtained, washing with an organic solvent, possibly drying, and then calcination. The ceric oxide obtained has an interesting specific surface when it is prepared in a calcination temperature range of from 300° to 600° C. However, a drop in specific surface is noted after calcination at a higher temperature, with the specific surface being 10 $m^2/g$ after calcination at 800° C.

FR-A 2,559,755 can also be cited, which relates to a ceric oxide having a specific surface of at least $85\pm5$ $m^2/g$ after calcination between 350° and 500° C. and, preferably, between 150 and 180 $m^2/g$ after calcination between 400° and 450° C. This oxide is obtained using a method which consists of precipitating a base ceric sulfate by reacting an aqueous solution of ceric nitrate and an aqueous solution containing sulfate ions, of separating the precipitate obtained, washing it using an ammonia solution, possibly of drying it and then calcining it at a temperature varying between 300° and 500° C. The ceric oxide prepared in this manner has a large specific surface, but when it is subjected to a calcination operation at 800° C., its specific surface decreases considerably and is about 10 $m^2/g$.

One of the objects of the present invention is to provide a ceric oxide which has a large specific surface at high temperatures.

Another object of the invention is a method enabling such an oxide to be obtained.

The characteristic of the oxide of the invention is that it has a specific surface of at least 15 $m^2/g$ measured after calcination at a temperature of between 800° and 900° C.

The preferred ceric oxide of the invention has a specific surface of between 20 and 60 $m^2/g$ measured after calcination at a temperature of 800° C.

In accordance with the calcination conditions of ceric hydroxide, ceric oxide has a specific surface between 15 and 160 $m^2/g$ measured after calcination at a temperature varying between 350° and 900° C.

FIG. 1 is a graph on which is shown the curve (A) of variation of the specific surface (expressed in $m^2/g$) of a ceric oxide of the invention as a function of the calcination temperature given in °C.

The ceric oxide of the invention has a specific surface of at least 15 $m^2/g$, measured after calcination at a temperature of between 800° C. and 900° C., and a specific surface greater than said surface after calcination at a temperature below the above-indicated range.

Thus, it can have a specific surface varying between 70 and 160 $m^2/g$ and, preferably, between 100 and 160 $m^2/g$, measured after calcination between 350° and 450° C. However, when it is subjected to a higher temperature of up to 900° C., at the time of its use, particularly in the catalysis field, it has the characteristic of retaining a specific surface of at least 15 $m^2/g$ and, preferably, between 20 and 60 $m^2/g$ when it is subjected to a temperature of 800° C.

In the present application, the specific surfaces expressed are measured on a product having undergone calcination for at least 2 hours.

Another characteristic of the ceric oxide of the invention is that it has a porous volume of greater than 0.1 $cm^3/g$ at a measurement temperature of between 800° and 900° C. and, preferably, greater than 0.15 $cm^3/g$.

The porous volume, which corresponds to pores with a diameter of less than 60 nm (600 Å), is measured with a mercury porosimeter in accordance with the ASTM D4284-83 standard or using the isotherm nitrogen adsorption method—the above-identified B.E.T. method.

Like the specific surface, the porous volume depends on the calcination temperature: it can vary between 0.35 and 0.15 $cm^3/g$ for a calcination temperature of between 350° and 900° C.

The preferred ceric oxide of the invention has a porous volume of between 0.15 and 0.25 $cm^3/g$ after calcination at a temperature of 800° C.

The size of the pores of a ceric oxide calcined at 800° C. ranges between 3 nm (30 Å) and 60 nm (600 Å); the average diameter ($d_{50}$) of the pores varies between 20 nm (200 Å) and 30 nm (300 Å) and is preferably approximately 25 nm (250 Å).

The average diameter is defined as being a diameter such that all the pores smaller than said diameter constitute 50% of the total porous volume (Vp) of pores with a diameter less than 60 nm (600 Å).

A ceric oxide calcined at 350° C. has pores of from 2 nm (20 Å) to 100 nm (1000 Å), with the average diameter varying from 10 nm (100 Å) to 20 nm (200 Å) and, preferably, about 15 nm (150 Å).

Analysis using X-ray diffraction shows that the ceric oxide of the invention has a crystalline phase of the $CeO_2$ type with a mesh parameter varying from 0.542 nm (5.42 Å) to 0.544 nm (5.44 Å). As an indication, it should be pointed out that the size of the crystallites of a ceric oxide obtained after calcination at 350° C. is between 4 nm (40 Å) and 6 nm (60 Å) and after calcination at 800° C. is between 10 nm (100 Å) and 20 nm (200 Å).

The method for obtaining the ceric oxide having a specific surface of at least 15 m²/g for a measurement temperature of between 800° C. and 900° C. is characterized by the fact that it consists:

of preparing a ceric hydroxide by reacting a solution of cerium salt and a base, possibly in the presence of an oxidizing agent, with the amount of the base being such that the pH of the reaction medium is greater than 7; of separating the precipitate obtained, and possibly washing it;

of placing the ceric hydroxide in suspension in water or in an aqueous solution of a decomposable base;

of heating it in a closed chamber to a temperature and a pressure respectively lower than the critical temperature and the critical pressure of said medium;

of cooling the reaction mixture and bringing it to atmospheric pressure;

of separating the ceric hydroxide treated in this manner;

then of calcining it.

Applicant has found that a ceric oxide with a large specific surface at high temperature could be obtained by subjecting a ceric hydroxide or ceric oxide hydrate obtained by base precipitation using a solution of a cerium salt under well-defined conditions, with an autoclave treatment carried out in water or in an aqueous solution of a decomposable base, before the calcination operation.

A ceric hydroxide is used in the method of the invention which is prepared in accordance with the method described below which consists of reacting a cerium salt solution and a base, possibly in the presence of an oxidizing agent and separating the precipitate obtained, possibly of washing it, and/or drying it.

The cerium salt solution used can be any aqueous cerium salt solution in the cerous and/or ceric state which is soluble in the conditions of preparation, in particular a cerous chloride or cerium nitrate solution in the cerous or ceric state of a mixture of same.

The cerium salt solution is selected such that it contains no impurities which can be found in the calcined product. It can be advantageous to use a cerium salt with a degree of purity of above 99%.

The concentration of the cerium salt solution is not a critical factor, in accordance with the invention, and it can vary within wide limits; a concentration of between 0.2 and 4 moles per liter is preferred.

In accordance with a preferred embodiment, the cerium is introduced into the reaction medium in the cerous state and is oxidized to the ceric state using an oxidizing agent.

Among the oxidizing agents which are suitable are, in particular, solutions of sodium, potassium or ammonium perchlorate, chlorate, hypochlorite, or persulfate, hydrogen peroxide or air, oxygen or ozone. Hydrogen peroxide is preferably used.

The amount of oxidizing agent in relation to the cerous salt to be oxidized can vary within wide limits. It is generally greater than the stoichiometry and preferably corresponds to an excess of between 10 and 40%.

Another preferred embodiment of the invention consists of using an aqueous solution of ceric nitrate. Ceric nitrate generally has a certain initial acidity and can have a normality varying between 0.01N and 5N. The concentration of $H^+$ ions is not critical. It is desirable for it to be between 0.1N and 1N.

By way of starting materials, a ceric nitrate solution can be used which is obtained by the action of nitric acid on a hydrated ceric oxide prepared in a conventional manner, for example, by the action of nitric acid on the cerous carbonate and addition of an ammonia solution in the presence of an oxidizing agent, preferably hydrogen peroxide.

The ceric nitrate solution obtained in accordance with the method of electrolytic oxidation of a cerous nitrate solution, which is described in French patent application No. FR-A 2,570,087 (No. 84 13541), is an ideal starting material.

The precipitation of the ceric hydroxide can be carried out by reaction of the cerium salt solution and a base solution.

The base solution used can, in particular, be an aqueous solution of ammonia or of sodium or potassium hydroxide. An ammonia solution is preferably used. The normality of the base solution used is not a critical factor in accordance with the invention; it can vary within wide limits and will, however, be preferably between 1 and 5 N, preferably 2 to 3N.

The quantity of base added is determined such that the pH of the reaction medium is greater than 7. It is preferably greater than 7.0 and less than approximately 10 and even more preferably between 7.5 and 9.0.

It can be particularly advantageous to adjust the pH within these limits to a constant value at ±0.1 units of pH.

The temperature of the reaction medium should preferably be between 5° and 70° C. and, more especially, between 40° and 70° C. The mixing time in the reaction medium is not a critical facial in accordance with the invention and can vary within wide limits; generally times of between 15 minutes and 2 hours are selected.

A precipitate is obtained which can be separated in accordance with conventional solid/liquid separation techniques, such as decanting, drying, filtration and/or centrifuging.

It is desirable to wash the separated precipitate so as remove the remaining anions adsorbed on the precipitate.

The washing is preferably carried out using water or a base solution, preferably with a concentration of between 1 and 5N. An ammonia solution is preferably sued. One or several washings can be carried out, most frequently from one to three washings.

The separated, and preferably washed, ceric hydroxide can be used directly in the method of the invention. It is also possible to use a ceric hydroxide having undergone a drying operation. The drying can be carried out in air or under reduced pressure, for example on the order of 1 to 100 mm of mercury (133.322 Pa to 13332.2 Pa). The drying temperature can vary between room temperature and 100° C. and the drying time is not critical and can be between 2 and 48 hours. The drying operation is optional and too much drying is not desirable.

The ceric hydroxide prepared in accordance with the abovedescribed method of precipitation and preferably used corresponds to the following formula (I):

$$Ce(OH)_x(X)_y \cdot nH_2O \qquad (I)$$

wherein:
X represents a chloride or nitrate anion,
y is less than 0.5,
x = 4 − y,
n varies between 0 and approximately 20.

The preferred compound corresponds to formula (I) in which y is between 0 and 0.1. Even more preferably, X represents a nitrate anion.

The preferred compound corresponding to formula (I) is prepared by reacting a solution of cerous chloride or cerous nitrate and a solution of ammonia, in the presence of hydrogen peroxide, of separating the precipitate obtained and submitting it to at least one washing, preferably with water.

The amount of base added is such that the reaction pH is greater than 7 and, preferably, between 7.5 and 9.

The temperature of the reaction medium is selected between 5° and 70° C., preferably between 40° and 70° C.

The ceric hydroxide obtained in accordance with the method described above is preferably used in the method which is the object of the present invention.

In accordance with the method of the invention, the ceric hydroxide is used in the form of a suspension in water or in an aqueous solution of a base which is decomposable in the calcination conditions of the invention.

"Decomposable base" is used to mean a compound with a pH of less than 7 which is capable of being decomposed under the calcination conditions of the invention.

The following can be cited as illustrative of such bases: urea, ammonium acetate, ammonium hydrogenocarbonate, ammonium carbonate, or a primary, secondary or tertiary amine, such as, for example, methylamine, ethylamine, propylamine, n-butylamine, sec-butylamine, n-pentylamine, 2-amino pentane, 2-amino 2-methyl butane, 1-amino 3-methyl butane, 1,2-diamino ethane, 1,2-diamino propane, 1,3-diamino propane, 1,4-diamino butane, 1,5-diamino pentane, 1,6-diamino hexane, dimethylamine, diethylamine, trimethylamine, triethylamine, or a quaternary amine such as, for example, a tetraalkylammonium hydroxide preferably with alkyl radicals containing from 1 to 4 carbon atoms, and more particularly tetramethylammonium hydroxide or tetraethylammonium hydroxide is used.

A mixture of bases can also be used.

A preferred embodiment of the method of the invention consists of using a solution of a decomposable base since it has unexpectedly been found that the fact of carrying out the autoclave operation in such a medium enables not only the specific surface of the ceric oxide obtained to be increased, but also provides a greater specific and porous volume up to temperatures of 900° C.

Preferably a solution of ammonia, tetraalkylammonium hydroxide or mixtures thereof are used.

When the liquid medium is a base solution, the concentration thereof is not a critical factor in accordance with the invention. It can vary within wide limits, for example, between 0.1 and 11N, but it is preferable to use solutions whose concentration varies between 1 and 10N.

In the liquid medium the concentration of ceric hydroxide expressed in $CeO_2$ can vary between 0.3 and 6 moles/liter, and preferably between 2 and 3 moles/liter.

The autoclave operation is carried out a temperature situated between the reflux temperature and the critical temperature of the reaction medium. Preferably, a temperature of between 100° C. and 350° C. is selected, and even more preferably, between 150° C. and 350° C.

The rise in temperature takes place at a speed which is not critical. The reaction is reached by heating, for example, for between 30 minutes and 4 hours.

The method of the invention can be carried out by placing the ceric hydroxide in suspension in the liquid medium into a closed chamber. The pressure therefore only results from the heating of the reaction mixture.

Under the temperature conditions given above and in an aqueous medium, it can be pointed out, by way of indication, that the pressure varies between $1(10^5$ Pa) and 165 Bars ($165.10^5$ Pa), preferably between $5(5.10^5$ Pa) and 165 Bars ($165.10^5$ Pa).

It is also possible to exert outside pressure which then adds to that resulting from the heating.

The length of the autoclave operation is not critical. It can vary between 30 minutes and 6 hours.

At the end thereof, it is left to cool using the inertia of the system and the system is returned to atmospheric pressure.

The product in suspension in the liquid medium is separated using conventional solid-liquid separation techniques, such as decanting, drying, filtration and/or centrifuging.

The collected product can possibly be washed and/or dried under the conditions previously described.

In accordance with a last step of the method of the invention, the product obtained is calcined at a temperature of between 300° C. and 1000° C. and, preferably, between 350° C. and 800° C.

The calcination time can vary within wide limits between 30 minutes and 10 hours, preferably between 2 and 6 hours.

The ceric oxide in accordance with the invention has a large specific surface at high temperatures such that it is fully suitable for the catalysis field, as a catalyst or as a catalytic support.

It is particularly appropriate for use as a catalytic support in reactions for the treatment of exhaust gases of internal combustion motors.

The examples which follow illustrate the invention without, however, limiting it.

Examples 1 to 9 relate to the new ceric oxide of the invention and the method for obtaining same.

Tests A and B are given by way of comparison; they do not include an autoclave treatment.

EXAMPLE 1

Test A

1. Synthesis Of The Ceric Hydroxide 922 cm³ of a solution of cerous nitrate containing 179 g/l of $CeO_2$ and 38 cm³ of a solution of 200 volume hydrogen peroxide at 50° C. were placed in a reactor with a double casing having a useful volume of 2 liters and equipped with a stirring device and a system for introduction of the reagent (doser pump).

825 cm³ of an aqueous solution of 4N ammonia was added until a pH of 8.4 was obtained.

With the reagents added, the reaction medium was maintained at 70° C. for 1 hour.

The precipitate was then separated on a Buchner. 569 g of a ceric hydroxide with a NO₃/Ce molar ratio of 0.1 were obtained.

X-ray diffraction analysis showed that the ceric hydroxide had crystallites with a diameter of 3 nm (30 Å).

2. Autoclaving the Ceric Hydroxide 30 cm³ of deionized water and 30 g of the ceric hydroxide prepared above were placed successively in a tall 100 cm³ beaker.

After homogenization of said ceric hydroxide in its medium, the beaker was placed in an autoclave having a useful volume of approximately 0.5 l.

This was brought to 200° C., which is approximately 16 bars (16.10⁵ Pa) for 4 hours using suitable heating means.

At the end of this hydrothermal treatment, the precipitate was filtered on a Buchner.

Using X-ray diffraction on the moist product, an average crystallite diameter of 4.5 nm (45 Å) was determined.

The product then underwent a calcination operation for 2 hours, with one fraction being calcined at 350° C. and the other at 800° C.

Using the methods defined in the description, the specific surface of the ceric oxide obtained and its porous volume <60 nm (< 60 Å) were then determined.

X-ray diffraction was also carried out to determine the size of the crystallites perpendicular to directions 110 and 220.

The results obtained are given in Table I. For purposes of comparison, the results obtained with a ceric oxide prepared using direct calcination at 350° C. and at 800° C. for 2 hours from the ceric hydroxide synthesized under 1 (Test A) are indicated.

TABLE I

|  | Calcination temperature °C. | Specific surface m²/g | Porous volume cm³/g | Diameter of the crystallites nm (Å) |
| --- | --- | --- | --- | --- |
| Example 1 | 350 | 110 | 0.20 | 5.0 (50) |
|  | 800 | 21 | 0.08 | — |
| Test A (without autoclaving) | 350 | 46 | 0.16 | 6.5 (65) |
|  | 800 | 11 | 0.06 | 30 (300) |

When the ceric oxide is calcined at a higher temperature, a decrease in surface and in the porous volume are noted due to the considerable fritting which translates into the high increase of the crystallites between 350° C. and 800° C.

However, the favorable effect of the autoclaving treatment is noted on the specific surface and the porous volume.

EXAMPLE 2

Test A

1. Synthesis of the Ceric Hydroxide

This was carried out using the method of Example 1—1.

2. Autoclaving of the Ceric Hydroxide

Using the operating protocol described in Example 1, 30 g of the ceric hydroxide prepared above, placed in suspension in 30 cm³ of an aqueous 1N ammonia solution, were subjected to treatment in an autoclave at 200° C. for 4 hours.

Using X-ray diffraction on the moist product, an average crystallite diameter of 4 nm (40 Å) was determined.

At the end of this hydrothermal treatment, the precipitate was filtered on a Buchner.

This was then subjected to a calcination operation for 2 hours: with one fraction being calcined at 350° C. and the other at 800° C.

The specific surface, the porous volume and the size of the crystallites of the ceric oxide having undergone the autoclaving treatment (Example 2) were then determined and, for purposes of comparison, those of the ceric oxide prepared by direct calcination at 350° C. and at 800° C. for 2 hours from the ceric hydroxide synthesized under 1 (Test A).

The results obtained are given in Table II.

TABLE II

|  | Calcination temperature °C. | Specific surface m²/g | Porous volume cm³/g | Diameter of the crystallites nm (Å) |
| --- | --- | --- | --- | --- |
| Example 2 | 350 | 127 | 0.35 | 4.5 (45) |
|  | 800 | 30 | 0.19 | 19 (190) |
| Test A (without autoclaving) | 350 | 46 | 0.16 | 6.5 (65) |
|  | 800 | 11 | 0.06 | 30 (300) |

As in the preceding example, the favorable effect of the autoclaving on the specific surface and the porous volume of the ceric oxide obtained after calcination at 800° C. are observed.

EXAMPLE 3

1. Synthesis of the Ceric Hydroxide

This was carried out using the method used in Example 1—1.

2. Autoclaving of the Ceric Hydroxide 25 cm³ of an aqueous solution of 20% tetraethylammonium hydroxide and 15 g of the ceric hydroxide prepared above were placed successively in a tall 100 cm³ beaker.

After homogenization of the medium, the beaker was placed in the autoclave.

This was brought to 200° C., which is approximately 16 bars (16.10⁵ Pa) for 3 hours using suitable heating means.

At the end of this hydrothermal treatment, the precipitate was filtered on a Buchner.

The product then underwent a calcination operation under the following conditions: one fraction was calcined for 2 hours at 350° C. and the other was calcined for 1 hour at 800° C.

The specific surface and the porous volume of the ceric oxides obtained were then determined.

The results obtained are given in Table III.

TABLE III

|  | Calcination temperature °C. | Specific surface m²/g | Porous volume cm³/g |
| --- | --- | --- | --- |
| Example 3 | 350 | 115 | 0.53 |
|  | 800 | 29 | 0.23 |

EXAMPLES 4 to 9

Test B

1. Synthesis of the Ceric Hydroxide 922 cm³ of a solution of cerous nitrate containing 150 g/l of CeO₂ and 38 cm³ of a solution of 200 volume hydrogen peroxide were placed at room temperature into an apparatus as described in Example 1.

150 cm³ of an aqueous 3 N ammonia solution were added, while maintaining the temperature at 8° C., until a pH equal to 9.5 was obtained.

With the reagents added, the reaction medium was maintained at 8° C. for 1 hour.

The separation of the precipitate was then carried out on a Buchner and washed with water.

Analysis using X-ray diffraction showed that the ceric hydroxide had crystallites with an average diameter of 3.5 nm (35 Å).

2. Autoclaving of the Ceric Hydroxide

A series of tests was carried out in which the autoclaving temperature was varied between 160° and 330° C.

Using the same operating protocol as described in the preceding examples, 150 g of ceric hydroxide prepared above were placed in suspension in 150 cm³ of an aqueous 1N ammonia solution and subjected to treatment in the autoclave for 4 hours.

At the end of this heat treatment, the precipitate was filtered on a Buchner.

This was then subjected to a calcination operation under the following conditions: one fraction was calcined for 2 hours at 350° C. and the other calcined for 2 hours at 800° C.

The specific surface and the porous volume of the ceric oxides obtained were then determined.

For purposes of comparison, the results are given which were obtained with a ceric oxide prepared by direct calcination at 350° C. and at 800° C. for 2 hours from the ceric hydroxide synthesized under 1 (Test B).

All the results obtained are given in Table IV.

TABLE IV

| | Autoclaving temperature °C. | Calcination temperature °C. | Specific surface m²/g | Porous volume cm³/g |
|---|---|---|---|---|
| Example 4 | 160 | 350 | 69 | |
| | 160 | 800 | 20 | |
| Example 5 | 180 | 350 | 85 | |
| | 180 | 800 | 20 | |
| Example 6 | 200 | 350 | 131 | 0.24 |
| | 200 | 800 | 26 | 0.24 |
| Example 7 | 250 | 350 | 126 | 0.27 |
| | 250 | 800 | 27 | 0.14 |
| Example 8 | 300 | 350 | 81 | 0.20 |
| | 300 | 800 | 31 | 0.12 |
| Example 9 | 330 | 350 | 73 | 0.25 |
| | 330 | 800 | 45 | 0.17 |
| Test B | — | 350 | 65 | 0.12 |
| | | 800 | 9.7 | 0.07 |

It can be noted that the ceric oxides of the invention have high specific surfaces measured after calcination at 800° C.

EXAMPLE 10

Test C

1. Synthesis of the Ceric Hydroxide

Into a reactor with a double casing in which heat-regulated water circulated at 20° C. and with a useful capacity of 2000 cm³, equipped with a stirring device and a system for introduction of the reagents, the following were simultaneously and continuously placed:

an aqueous solution of ceric nitrate containing 1 mole/liter of cerium IV, 0.06 mole/liter of cerium III and with a free acidity of 0.5N, prepared by electrolysis in accordance with FR-A 2,570,087 (No. 84 13641), at a rate of 0.78 liter/hour, an aqueous solution of 3N ammonia, at a rate of 1.22 liters/hour.

Mixing was carried out under stirring at 300 rpm for 60 minutes.

The rates of addition of the starting solutions were regulated such that the pH was maintained at 9.0.

The precipitate formed was separated on a Buchner.

A product containing 20% by weight of ceric oxide and with a crystallite size of less than 3 nm (30 Å) was obtained.

2. Autoclaving of the Ceric Hydroxide

In an autoclave having a useful volume of 1.5 l, 300 cm³ of NH₄OH 1N and 100 g of the ceric hydroxide prepared above were placed successively.

After homogenization of said ceric hydroxide in its medium this was brought to 200° C., which is approximately 16 bars (16.10⁵ Pa) for 3 hours using suitable heating means.

At the end of this hydrothermal treatment, the precipitate was filtered on a Buchner.

The fractions of this moist product then underwent a calcination operation under the following conditions: 2 hours at 350° C. and 1 hour at 800° C.

Using the methods defined in the description, the specific surface of the ceric oxide obtained and its porous volume were then determined.

The results obtained are given in Table V.

For purposes of comparison, the results obtained with a ceric oxide prepared using direct calcination at 350° C. for 2 hours and at 800° C. for 1 hour from the ceric hydroxide synthesized under 1 (Test A) are indicated.

TABLE V

| | Calcination temperature °C. | Specific surface m²/g | Porous volume cm³/g |
|---|---|---|---|
| Example 10 | 350 | 155 | 0.24 |
| | 800 | 17 | 0.06 |
| Test C | 350 | 53 | 0.05 |
| (without autoclaving) | 800 | 4.9 | 0.03 |

The favorable effect of the autoclaving can be noted on the specific surface and the porous volume of the ceric oxide after calcination at 800° C.

What is claimed is:

1. A method for obtaining a ceric oxide having a specific surface of at least 15 m²/g, measured after calcination at a temperature of between 800° and 900° C., said method comprising preparing a ceric hydroxide precipitate by reacting a solution of cerium salt, a base, and optionally, an oxidizing agent, the amount of base being selected such that the pH of the resulting reaction medium is greater than 7; (ii) separating the ceric hydroxide precipitate; optionally (iii) washing the ceric hydroxide precipitate; (iv) placing the ceric hydroxide in suspension in water or in an aqueous solution of a decomposable base; (v) heating the suspension or solution in a closed chamber to a temperature and pressure lower than the critical temperature and critical pressure thereof; (vi) cooling the suspension or solution and returning it to about atmospheric pressure; (vii) separating the resulting ceric hydroxide; and (viii) calcining the separated ceric hydroxide.

2. A method according to claim 1, wherein the cerium salt is cerous chloride or cerium nitrate in the cerous or ceric state, or mixtures thereof.

3. A method according to claim 2, wherein the solution of step (i) is an aqueous solution which contains ceric nitrate, or cerous nitrate and an oxidizing agent.

4. A method according to claim 3, wherein the cerium salt solution is an aqueous solution of ceric nitrate from an electrochemical oxidation of a cerous nitrate solution, or a solution from a reaction of nitric acid and hydrated ceric oxide.

5. A method according to claim 1, wherein the base is an ammonia solution.

6. A method according to claim 3, wherein the solution of step (i) contains cerous nitrate and an oxidizing agent, said oxidizing agent being hydrogen peroxide.

7. A method according to claim 1, wherein step (i) the pH is greater than 7 but less than about 10.

8. A method according to claim 7, wherein said pH ranges from 7.5 to 9.0.

9. A method according to claim 1, wherein the temperature of the reaction medium ranges from 5° to 70° C.

10. A method according to claim 9, wherein the temperature of the reaction medium ranges from 40° to 70° C.

11. A method according to claim 1, wherein the separated ceric hydroxide is washed using water or a base solution.

12. A method according to claim 1, wherein the precipitated ceric hydroxide corresponds to the formula:

$$Ce(OH)_x(X)_y, nH_2O \qquad (I);$$

wherein X represents a chloride or nitrate anion; y is less than 0.5; $x=4-y$; and n varies between 0 and approximately 20.

13. A method according to claim 12, wherein the ceric hydroxide of formula (I), y ranges from 0 to 0.1.

14. A method according to claim 13, wherein the ceric hydroxide of formula (I) is prepared by (i) reacting a solution of cerous chloride or nitrate and an ammonia solution in the presence of hydrogen peroxide, at a pH of between 7.5 and 9.0, and at a reaction temperature of between 40° C. and 70° C., and wherein the precipitate is separated and washed.

15. A method according to claim 1, wherein the ceric hydroxide precipitate is placed in an aqueous solution of a decomposable base, and the decomposable is ammonia, urea, ammonium hydrogenocarbonate, ammonium carbonate, a primary, secondary, tertiary or quaternary amine, or mixtures thereof.

16. A method according to claim 15, wherein the decomposable base is ammonia, a tetraalkylammonium or mixtures thereof.

17. A method according to claim 15, wherein the base solution has a concentration ranging from about 1 to 10N.

18. A method according to claim 1, wherein step (iv) the concentration of ceric hydroxide, expressed in $CeO_2$, ranges from 0.3 to 6 moles/liter.

19. A method according to claim 18, wherein the concentration ranges from 2 to 3 moles/liter.

20. A method according to claim 1, wherein step (v) involves autoclaving and the temperature ranges from 100° to 350° C.

21. A method according to claim 20, wherein the temperature ranges from 150° C. and 350° C.

22. A method according to claim 1, wherein step (v) the pressure ranges from 1 bar ($1 \times 10^5$ Pa) to 165 bars ($165 \times 10^5$ Pa).

23. A method according to claim 22, wherein the pressure ranges from 5 bars ($5 \times 10^5$ Pa) to 165 bars ($165 \times 10^5$ Pa).

24. A method according to claim 20 wherein the autoclaving time ranges from 30 minutes to 6 hours.

25. A method according to claim 1, wherein calcination is carried out at a temperature ranging from 300° C. to 1000° C.

26. A method according to claim 25, wherein the calcination temperature ranges from 350° C. and 800° C.

27. A method according to claim 25, wherein calcination is carried out from 2 to 6 hours.

* * * * *